UNITED STATES PATENT OFFICE.

A. C. CHURCH, OF UNION CITY, MICHIGAN.

IMPROVEMENT IN PAINT VEHICLES.

Specification forming part of Letters Patent No. 19,014, dated January 5, 1858.

*To all whom it may concern:*

Be it known that I, A. C. CHURCH, of Union City, in the county of Branch and State of Michigan, have invented a new and useful Compound for Mixing Paints; and I do hereby declare that the following is a full, clear, and exact description of the component parts of and manner of compounding the same.

The component parts and their proportions are as follows: linseed-oil, one gallon; soft soap, one gallon; distilled rain-water, one gallon; oil of turpentine, four (fluid) ounces; gum mastic, one-fourth ounce; caoutchouc, one-eighth ounce.

The compound is made in the following manner: The oil of turpentine, gum mastic, and caoutchouc are put into a well-corked bottle and well shaken or agitated together several times a day for three or four days, and then allowed to rest for a short time. When the compound liquid solution of gum mastic and caoutchouc has been thus obtained, the soft soap (which should be one year old and of good quality) is to be mixed with the distilled rain-water, and the mixture heated over a fire till it boils, stirring it well during the heating. The linseed-oil is also placed on the fire and heated to the boiling-point. The oil and soap mixture, after being boiled separately, are allowed to cool to about blood heat, and then poured together, after which the gum mastic and caoutchouc solution, having been poured off gently from its dregs, is added, and the whole, after being well stirred, is placed over a gentle fire and heated, its heat being increased for half an hour till it almost boils, but is not allowed to boil. The compound is then strained through a coarse cloth, and when cold is ready for use.

This compound is used in the same manner as oil for mixing paint. Turpentine may be used with it as in common oil-paint, and the same driers may be used with it as are generally used by painters. It makes a paint that is cheaper than common oil-paint and one that is more durable, owing to the alkali and gums preventing the oil leaving the paint and being absorbed by the wood, and this paint is susceptible of a high polish when well dried, takes varnish well, and dries quicker than oil-paint.

I am aware that the addition of soap to paint is well known, and I therefore do not broadly claim its use. The simple addition of soap to common paints is productive of no specially useful purpose. Such mixtures, if exposed to the sun or any gentle heat while drying, are absorbed by the wood. Besides this, they peel off when exposed to a very low temperature of the atmosphere, as in winter. An example of such a mixture may be found in the American Practical Receipt Book, page 227. It is a very expensive compound, costing nearly double the price of my mixture. My compound, when applied to wood, is not absorbed thereby, nor is it affected by any changes in the temperature of the atmosphere. It is also cheap and readily made. To the best of my knowledge and belief no compound like it has ever been known or used.

What I claim as my invention, and desire to secure by Letters Patent, is—

The compound for mixing paints, composed of the within specified materials, combined in the manner substantially as and in about the proportions herein set forth.

A. C. CHURCH.

Witnesses:
CHS. M. WHITING,
H. F. EWERS.